Sept. 26, 1933.                M. PRISK                  1,928,186
                            SAFETY AIR VALVE
                            Filed Dec. 5, 1931
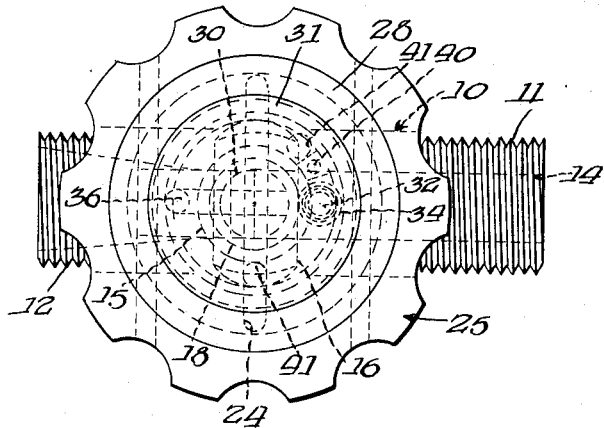
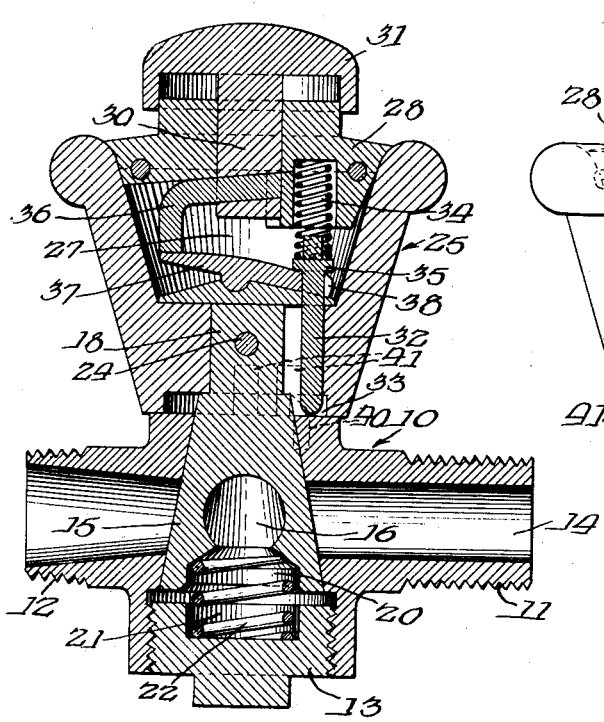
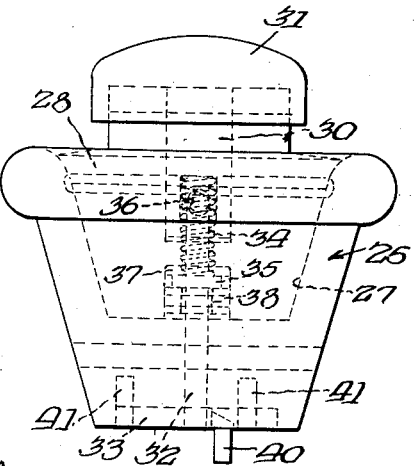

Patented Sept. 26, 1933

1,928,186

UNITED STATES PATENT OFFICE 1,928,186

SAFETY AIR VALVE

Michael Prisk, Ely, Minn.

Application December 5, 1931. Serial No. 579,284

2 Claims. (Cl. 251—164)

The invention relates to valve structures and has reference particularly to a safety valve having means preventing inadvertent opening and closing of the same.

An object of the invention is to provide a rotatable valve with an improved form of locking means which must first be released by the operator before actuation of the valve is possible.

A further object is to provide a valve wherein the handle for rotating the valve member has interfitting engagement with the casing, preventing inadvertent rotation of the same, and wherein the handle is provided with depressible means operative for releasing the lock, thus requiring a definite act before rotation of the handle is possible.

A further object is to provide locking means for safety valves which will permit actuation by the same hand of the operator as is used for rotating the valve member and which will be efficient in operation and fulfill all requirements of service and manufacture.

With these and various other objects in view, the invention may consist of certain novel features of construction and operation as will be more fully described and particularly pointed out in the specification, drawing and claims appended hereto.

In the drawing which illustrates an embodiment of the device and wherein like reference characters are used to designate like parts—

Figure 1 is a longitudinal vertical sectional view taken substantially through the center of a safety valve showing the same equipped with the locking means of the present invention;

Figure 2 is a top plan view of the valve structure shown in Figure 1, and

Figure 3 is an elevational view of the handle and sleeve in associated relation.

The preferred embodiment of the valve structure disclosed consists in a valve casing 10 having threaded ends 11 and 12 and a threaded bottom opening for receiving the plug 13. The casing is provided with a longitudinal bore or passageway 14 intercepted by the valve member 15 provided with the passageway 16 extending therethrough and which in one rotated position of the member is in alignment with the passageway 14 and in another rotated position is located at substantially right angles to the passageway. It will be understood that in this latter position the passageway 14 is closed.

The valve member 15 is of tapered formation throughout the greater portion of its length, being provided with a projecting end 18 extending outwardly of the casing 10 and having formed in its end opposite the projecting end a recess 20 co-operating with a recess 21 provided in the plug 13. With the plug in position in the casing the recesses are disposed in alignment and are adapted to retain the coil spring 22 for forcing the valve member upwardly in the casing, maintaining its tapered outward surfaces in close contact with the engaging surfaces of the casing.

It will be seen by reference to Figure 1 that the opening in the bottom of the casing is of a diameter large enough to permit the insertion of the valve member through the opening, after which the spring 22 and plug are located in position, holding the parts in operative relation.

Secured to the projecting end 18 of the valve member by means of pin 24 is a handle 25 having notches formed around the periphery of its upper end, adapted to be grasped by the operator and having a cavity 27 provided centrally of the same. The cavity is closed by means of a cover 28 having slidably positioned therein the stud 30 formed integral with an actuating member 31 of inverted cup-shaped form.

Mounted for vertical reciprocation in the handle 25 is a locking pin 32, the lower end of which extends into an annular recess 33 provided in the base of the handle, while its upper end extends a distance within the cavity 27. The pin is resiliently urged downwardly by the coil spring 34 positioned within a recess provided in the cover 28 and having its other end in engagement with shoulder 35 formed integral with the pin. The actuating member 31 is provided for the purpose of lifting pin 32 so that its lower end is removed from location within recess 33. The connections consist of an angular strip of metal 36 suitably secured to the depending end of stud 30 and contacting one side of the pivotally mounted plate 37. The opposite end of the plate is formed with slot 38 for receiving the pin 32 at a point immediately below the integral shoulder 35, and by reason of the tension exerted by spring 34 the shoulder and plate are held in engagement with that end of the plate in depressed position. With the parts as described it will be seen that the lower end of pin 32 projects into recess 33.

The locking means provided on the casing consists of a pin 40 projecting upwardly from the upward flat face of the casing and being positioned so as to project within the recess 33. Fitted to the handle 25 and also projecting into recess 33 are two spaced stop pins 41, the pins being so positioned as to be located on opposite sides of the pin 40. It will be seen by reference to Figures 2 and 3 that rotation of the handle 25 will cause contact between one of the stop pins 41 and the pin 40, the location of the parts in these instances determining the open and closed positions of the valve member 15. The locking pin 32 also extends into recess 33 and thus has engagement against pin 40 and when the pin is positioned between the locking member and the stop pin 41 the handle is held in closed position.

When it is desired to rotate the handle in a direction so as to open the valve it is only necessary to lift the locking pin so that its lower end does not extend into recess 33 in which position it is out of contact with the pin 40. This permits the handle to be rotated until the limit of the rotation is reached by engagement of the stop pin 41 with pin 40. The location of the pins with the valve in open position is reversed from that above described. In this instance the pin 40 is positioned between the locking member and the left stop pin 41 and the valve will be held open as long as the locking pin is allowed to remain in its lowermost position.

In order to cause actuation of the locking member for releasing handle 25 from locking engagement with the casing it is necessary to depress the actuating member 31, causing a pivotal movement of plate 37 to take place to lift the pin against the tension of spring 34. The location of the actuating member is such that the operator in grasping the handle automatically places the palm of his hand over the member and the necessary pressure for releasing the handle can readily be imparted to the member. The tension of the spring 34 is sufficiently strong to prevent inadvertent actuation of the part through carelessness of the operator and accordingly it is necessary to perform a definite act before it is possible to rotate the handle for closing or opening the valve.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In valve structure, a casing, a rotatable valve member therein, a handle secured to the member and providing means for rotating the member, a cavity in the handle, a locking pin located within the cavity for locking the handle and casing against relative rotation, a cover for the cavity, a depressible member mounted in the cover, and means in the cavity connecting the member with the pin, whereby the member is operative for releasing the locking pin permitting rotation of the handle.

2. In a valve structure, a casing, a rotatable valve member therein, a handle secured to said member and providing means for rotating the member, said handle having a cavity centrally thereof opening in a direction opposite to the casing, a cover for the handle closing the cavity, a locking pin in the handle engaging the casing and being biased toward the casing by resilient means located between the cover and the pin, a pivoted actuating plate mounted in the base of said cavity and having operative connection at one end with the pin, and depressible means mounted centrally of the cover and having connection with the other end of the actuating plate whereby depression of said means in the cover serves to rotate said actuating plate to lift the locking pin permitting rotation of the handle.

MICHAEL PRISK.